(12) United States Patent
Therond et al.

(10) Patent No.: US 8,746,611 B2
(45) Date of Patent: Jun. 10, 2014

(54) LIGHTNING PROTECTION ARRANGEMENT FOR AN ELECTRONIC UNIT

(75) Inventors: Frederic Therond, Plaisance du Touch (FR); Thomas Frontzek, Bremen (DE)

(73) Assignees: Airbus Operations GmbH, Hamburg (DE); Airbus Operations (S.A.S.), Toulouse (FR)

( * ) Notice: Subject to any disclaimer, the term of this patent is extended or adjusted under 35 U.S.C. 154(b) by 147 days.

(21) Appl. No.: 13/016,649

(22) Filed: Jan. 28, 2011

(65) Prior Publication Data

US 2011/0259999 A1     Oct. 27, 2011

Related U.S. Application Data

(63) Continuation of application No. PCT/EP2010/057677, filed on Jun. 2, 2010.

(60) Provisional application No. 61/183,732, filed on Jun. 3, 2009.

(30) Foreign Application Priority Data

Jun. 3, 2009   (DE) .................. 10 2009 026 686

(51) Int. Cl.
*B64D 45/02*     (2006.01)
(52) U.S. Cl.
USPC ........................................................... 244/1 A
(58) Field of Classification Search
USPC ........ 244/1 A, 121, 129.1, 131, 132; 361/218
See application file for complete search history.

(56) References Cited

U.S. PATENT DOCUMENTS

| 4,502,092 | A | * | 2/1985 | Bannink et al. ............... 361/218 |
| 4,542,056 | A | * | 9/1985 | Anglin et al. ................. 428/116 |
| 5,841,066 | A |   | 11/1998 | Bocherens |

(Continued)

FOREIGN PATENT DOCUMENTS

| DE | 1296539 | 5/1969 |
| EP | 0790182 B1 | 8/1997 |
| GB | 1201722 | 8/1970 |
| WO | WO 02/36426 A2 | 5/2002 |

OTHER PUBLICATIONS

International Search Report for WO 2010/139709 dated Dec. 9, 2010.

(Continued)

*Primary Examiner* — Rob Swiatek
*Assistant Examiner* — Timothy Schwarz
(74) *Attorney, Agent, or Firm* — Jenkins, Wilson, Taylor & Hunt, P.A.

(57) ABSTRACT

Lightning protection arrangement for diverting a current, caused by a lightning strike, from an electronic unit which is fitted to an aerodynamic fairing of an aircraft. The device includes an electrically conductive mounting plate which is arranged on an outer side of a CFRP sandwich panel of the aerodynamic fairing. Furthermore, the device has an electrically conductive rear plate which is arranged on an inner side of the CFRP sandwich panel of the aerodynamic fairing and is connected electrically to the mounting plate. In this respect, a first group of attachment means provided for the electronic unit connects the electrical unit electrically to the rear plate. An electric current generated during a lightning strike is diverted with low resistance from the electrical unit via the rear plate and the mounting plate onto the fuselage of the aircraft.

25 Claims, 4 Drawing Sheets

(56) References Cited

U.S. PATENT DOCUMENTS

| | | |
|---|---|---|
| 7,485,800 B2 * | 2/2009 | Berrada et al. ............... 174/5 R |
| 7,988,094 B2 * | 8/2011 | Ostrem et al. ............ 244/129.3 |
| 2005/0190547 A1 | 9/2005 | Berrada |
| 2007/0257152 A1 * | 11/2007 | Bergerson et al. ........... 244/133 |
| 2008/0170349 A1 * | 7/2008 | Stein ........................... 361/218 |
| 2008/0297967 A1 * | 12/2008 | Winter et al. ................ 361/117 |
| 2009/0039199 A1 * | 2/2009 | Brown ......................... 244/126 |
| 2010/0025533 A1 * | 2/2010 | Bimanand et al. ........... 244/121 |

OTHER PUBLICATIONS

Chinese Office Action for Application No. 201080001756.8 dated Jul. 19, 2013.

* cited by examiner

LIGHTNING PROTECTION ARRANGEMENT FOR AN ELECTRONIC UNIT

CROSS-REFERENCE TO RELATED APPLICATIONS

This application is a continuation of PCT/EP2010/057677 filed Jun. 2, 2010 and claims the benefit of U.S. Provisional Application No. 61/183,732, filed Jun. 3, 2009 and German Patent Application No. 10 2009 026 686.0, filed Jun. 3, 2009, the entire disclosures of which are herein incorporated by reference.

FIELD OF THE INVENTION

The invention relates to a lightning protection arrangement of an aircraft for diverting a lightning current, caused by a lightning strike, from an electronic unit which is fitted to an aerodynamic fairing of the aircraft.

In aircraft construction, composite materials, in particular laminar composites are used to reduce the weight of the aircraft. In this respect, so-called CFRP sandwich panels are widely used components which have a honeycomb-structured middle layer consisting of resin-impregnated paper. This honeycomb-structured middle layer is enclosed on both sides by in each case at least one layer consisting of carbon fibre-reinforced plastics material. CFRP sandwich panels of this type are characterised by high mechanical stability together with low weight.

In aircraft, various electronic components, in particular antennae, signal lights, illumination means as well as sensor and measuring elements, are fitted to the outer skin of the aircraft fuselage. Various antennae are provided for different functions, for example for navigation of the aircraft or for communication with a station on the ground. Examples of such antennae are V/UHF (very/ultra high frequency) antennae, TACAN (technical air navigation) antennae and GADIRS (GPS Air Data Inertia Reference System) antennae. These antennae must be at a minimum distance from one another so that a signal radiated from one antenna does not obstruct the received signal of another antenna, resulting here in a disturbed signal. Mounted on the outer skin of an aircraft fuselage are typically more than twenty electronic components or units, such as antennae, signal lights, sensors and the like. Therefore, in spite of the minimum distance which is necessary to some extent, the area for attaching such electronic components is restricted. Particularly in the case of relatively small passenger aircraft and aircraft in which the aerofoils or wings rest on top of the aircraft fuselage (high wing aircraft), the area available for electronic components is reduced.

EP 0 790 182 B1 discloses lightning conductor strips which are used in particular for the protection of scanners on aircraft. In this respect, one side of a lightning conductor strip is attached to the surface to be protected against lightning and the other side of the lightning conductor strip is exposed to the lightning. These known lightning conductor strips consist of a thermoplastic polymer charged with conductive particles.

DE 1 296 539 describes a lightning protection device for a motor vehicle body which is produced from plastics parts. Electrical conductors made, for example, of copper mesh fabric are arranged on, or embedded in, the plastics material components. These electrical conductors are connected in an electrically conducting manner to other parts of the motor vehicle at connection points.

Figure 1:
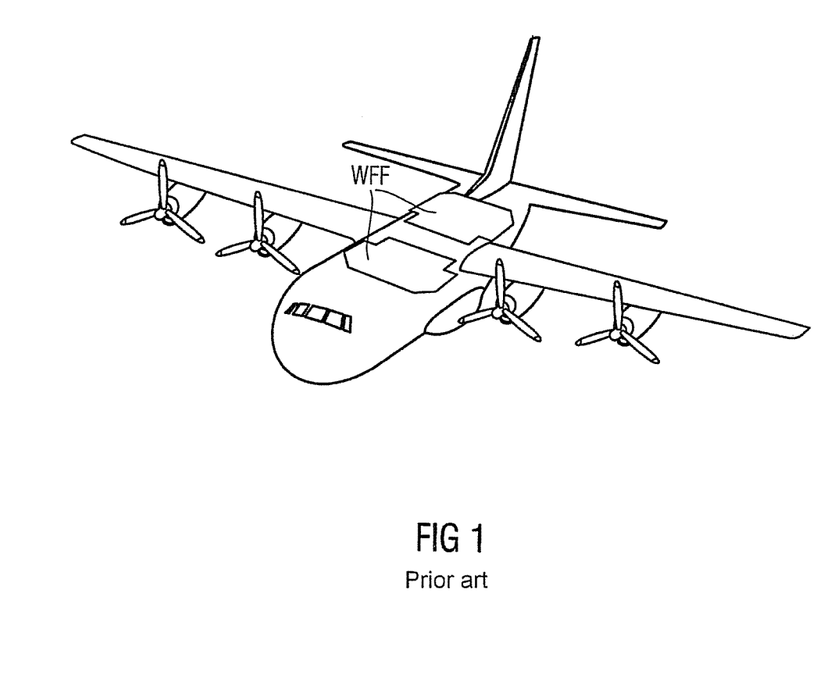
FIG. 1 shows structural components of a conventional aircraft according to the prior art.

FIG. 1 shows an aircraft according to the prior art, in which the aerofoils rest on the aircraft fuselage. In this respect, a flow-shaped aerodynamic fairing WFF (wing fuselage fairing) is fitted to reduce air drag. To avoid unnecessary weight, this aerodynamic fairing WFF is conventionally formed from CFRP sandwich panels.

To allow electronic components to be fitted to the outer skin of the aircraft fuselage, adequate protection against lightning strikes must be provided so that the functional capability of the corresponding electronic units is not impaired, or even destroyed, during a lightning strike on the aircraft. Conventional CFRP sandwich panels which are also used for the aerodynamic fairing shown in FIG. 1 in the transition region between the aerofoils and the aircraft fuselage do not allow electronic units to be attached thereto, because although the upper and lower CFRP layers of the sandwich panel are electrically conductive, they only have a very high transition resistance for diverting overvoltages or electronic current generated by a lightning strike. In conventional CFRP sandwich panels, the thickness of the CFRP layer consisting of at least one CFRP sheet is low, so that the electrical conductivity is also relatively low. Due to its material characteristics, a structure consisting of fibre composite material behaves in a different manner during a lightning strike compared to a structure consisting of metallic materials. A fibre composite material is anisotropic (CFRP/BFRP) or non-conductive (GFRP/SFRP) with respect to electrical conductivity. The specific electrical resistance of a fibre composite material is higher by a few decimal powers than that of metals. This means that a fibre composite material itself is unsuitable as a conductor of high lightning currents. In the event of a lightning strike, the lightning current is not prevented from penetrating inside the material due to the low, but present, conductivity of the fibre composite material. The result of this is that a considerable amount of thermal and also mechanical energy is released by the relatively high specific resistance which can severely damage the fibre composite material structure. Thus, even structures of fibre composite materials with high electrical dielectric strengths can be penetrated by lightning. This is particularly the case when devices with a locally high electrical potential, such as radar devices, electronic devices, antennae, generators and metallic substructures are in the vicinity of the strike location. When an electronic component or an electronic unit is directly attached, a conventional CFRP sandwich panel, as used for example in the WFF aerodynamic fairing shown in FIG. 1, cannot ensure adequate lightning protection, since the transition resistance of the CFRP sandwich panel is too high. The transition resistance of a conventional CFRP sandwich panel is more than 100 mΩ, as a function of the panel size and layer structure. However, a transition resistance of at most 5 mΩ to the fuselage is required for adequate lightning resistance.

Therefore, in the case of conventional aircraft which use CFRP sandwich panels, it is not possible to provide them with electronic units, for example with antennae, since there is no adequate lightning protection or electrical bonding (electrical connection).

SUMMARY OF THE INVENTION

It is therefore an object of the present invention to provide an arrangement for protecting an electronic unit against damage caused by lightning strikes and for the diversion thereof, which arrangement makes it possible for this electronic unit to be attached to a CFRP sandwich panel.

This object is achieved according to the invention by a lightning protection arrangement which has the features described hereinbelow. The lightning protection arrangement takes into account electrical bonding requirements and replaceability requirements.

The invention relates to a lightning protection arrangement for diverting an electrical current which acts as a structure-loading flow for a short time by the effect of lightning on an electronic unit, the electrical unit being fitted to an aerodynamic fairing of an aircraft. The components of this lightning protection arrangement are an electrically conductive mounting plate arranged on an outer side of a CFRP sandwich panel of the aerodynamic fairing, and an electrically conductive rear plate arranged on an inner side of the CFRP sandwich panel of the aerodynamic fairing, as well as a plurality of specially installed attachment means, for example a total of three groups of attachment means which electrically connect the electronic unit, the mounting plate and the rear plate, so that the lightning current which is generated and flows as a result of the lightning strike impacting the mounting plate is diverted with low resistance onto the aircraft fuselage.

Thus, the lightning protection arrangement according to the invention serves as a lightning current arrester for an electronic unit fitted to an outer skin of an aircraft, this electronic unit being attached to a CFRP sandwich panel.

In an embodiment of the lightning protection arrangement according to the invention, the electronic unit to be protected rests on the centre of the mounting plate, separated by an anticorrosive sealing layer.

The anticorrosive sealing layer forms a moisture barrier and protects the underlying structures against corrosion.

In an embodiment of the lightning protection arrangement according to the invention, the CFRP sandwich panel has at least one upper CFRP sheet which consists of carbon fibre-reinforced plastics material, a honeycomb-structured layer, in particular of resin-impregnated paper, and at least one lower CFRP sheet which consists of carbon fibre-reinforced plastics material.

The use of CFRP sandwich panels for the aerodynamic fairing reduces the weight of the fairing and thus the weight of the aircraft. Fuel can be saved in flight operation as a result of the reduced overall weight.

In an embodiment of the lightning protection arrangement according to the invention, a wire mesh or a metal foil is applied to the outer CFRP sheet of the CFRP sandwich panel to protect the CFRP sandwich panel in the event of possible direct lightning strikes.

Since the electronic component fitted to the CFRP sandwich panel only covers part of the CFRP sandwich panel, a metallic layer which is configured in the manner of a mesh or a net and is preferably realised with a wire mesh (bronze netting) provides lightning protection when lightning strikes the remaining outer side of the CFRP sandwich panel itself and not the electronic component. If a wire mesh is not provided, a lightning strike onto the CFRP sandwich panel would result in structural damage, for example in the creation of a hole in the CFRP sandwich panel. For this reason, the wire mesh is preferably produced from a metal alloy, for example bronze.

In an embodiment of the lightning protection arrangement according to the invention, the mounting plate and the rear plate consist of a metal which, according to the known electrochemical series, has a low potential difference compared both to the material of the wire mesh and to the CFRP and likewise weighs as little as possible.

The advantage of this embodiment is that due to the low electrochemical potential difference, possible corrosion effects can be minimised.

In a preferred embodiment of the lightning protection arrangement according to the invention, the mounting plate and the rear plate consist of titanium.

Titanium is characterised by a low weight for a low potential difference in the electrochemical series compared to copper alloys and to CFRP.

In an alternative embodiment, the mounting plate and the rear plate consist of aluminium. The electrochemical potential difference between aluminium and copper or CFRP is greater than for titanium, so that in the case of a "relatively impure" material, corrosion phenomena will be increasingly anticipated.

Aluminium is characterised by a particularly low inherent weight.

In an embodiment of the lightning protection arrangement according to the invention, the rear plate is configured to be annular.

The annular shape of the rear plate entails a further reduction in weight.

In a further embodiment of the lightning protection arrangement according to the invention, the outer periphery of the rear plate is electrically connected to the mounting plate by a second group of attachment means.

In a further embodiment of the lightning protection arrangement according to the invention, the outer periphery of the mounting plate is electrically connected to a retaining structure by a third group of attachment means and the mounting plate is connected to the fuselage of the aircraft by said retaining structure.

The provision of further attachment means makes it possible for the entire fixedly arranged CFRP sandwich panel including the electronic component fitted thereto or a similarly fitted electronic unit to be easily and rapidly dismounted or replaced.

In this respect, the lightning protection arrangement can be dismounted from the retaining structure by releasing the third group of attachment means.

In an embodiment of the lightning protection arrangement according to the invention, the electronic unit to be protected is an antenna.

In an alternative embodiment of the lightning protection arrangement according to the invention, the electronic unit to be protected is a sensor element.

In a further embodiment of the lightning protection arrangement according to the invention, the electronic unit to be protected is a signal light.

In a further embodiment of the lightning protection arrangement according to the invention, the electronic unit to be protected is an illumination unit.

In an embodiment of the lightning protection arrangement according to the invention, the transition resistance for diverting the lightning current onto the fuselage of the aircraft is less than 5 m$\Omega$.

In an embodiment of the lightning protection arrangement according to the invention, an overvoltage generated after a lightning strike is diverted from the electronic unit via the first group of attachment means to the rear plate and from there via the second group of attachment means back to the mounting plate and from there via the third group of attachment means to the retaining structure of the fuselage.

In an embodiment of the lightning protection arrangement according to the invention, the attachment means are formed in each case by screws and plate nuts (configured as ground points) with a suitable electrically conductive surface protection.

This allows the production of reliable electrical ground points or electrical connection points (electrical bonding).

Screw connections or screw attachments also have the advantage that they are easy (easier) to release compared to riveted joints.

In an alternative embodiment, the attachment means are formed by electrically conductive rivets or bolts.

In the following, embodiments of the lightning protection arrangement according to the invention are described with reference to the accompanying figures.

DESCRIPTION OF EXEMPLARY EMBODIMENTS

Figure 2A:
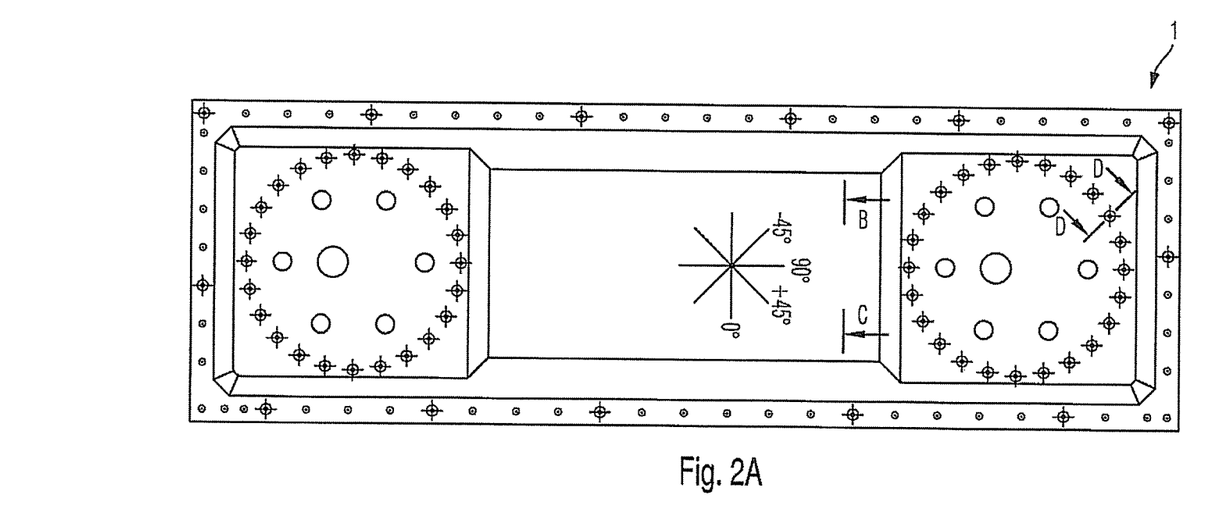
FIG. 2A, 2B are a top view and a sectional view of a CFRP sandwich panel which uses the arrangement according to the invention for diverting a current.
Figure 2B:
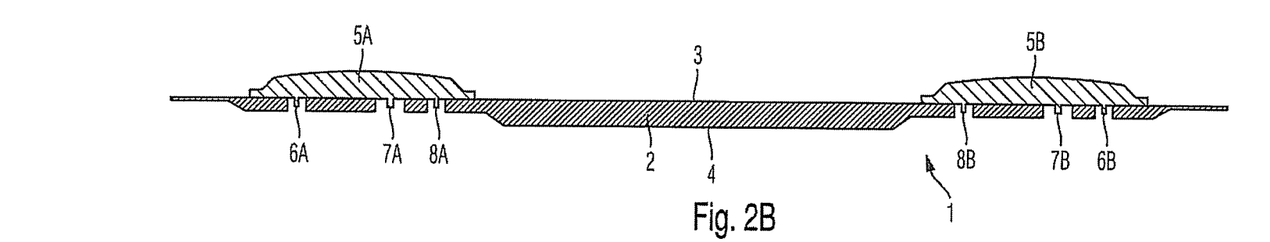

As can be seen from FIG. 2A and 2B, the CFRP sandwich panel 1 used in the region of the aerodynamic fairing has a honeycomb-structured layer 2 which consists, for example, of resin-impregnated paper. Located on the upper side or outer side of this honeycomb middle layer 2 is at least one CFRP sheet 3, the thickness of which is relatively low to reduce weight. Located on the CFRP outer sheet is a wire mesh for protecting the CFRP sandwich panel 1. Located on the lower side or inner side of the fairing is also at least one CFRP sheet 4 consisting of carbon fibre-reinforced plastics material. Each CFRP sandwich panel 1 has an encircling monolithic (without honeycomb) peripheral region. This peripheral region is used for mechanically contacting the retaining structure. At the sides, the honeycomb-structured middle layer 2 tapers for the attachment of electronic components 5A, 5B which are antennae in the illustrated example. These antennae have electronic connections or coaxial connectors 6A, 7A, 8A and 6B, 7B, 8B, respectively. These connecting contacts can be contacted or connected from inside via holes in the CFRP sandwich panel 1. In the embodiment shown in FIG. 2, the CFRP sandwich panel 1 is configured symmetrically for the connection of two antennae 5A, 5B on both sides of the aerodynamic fairing shown in FIG. 1. The size of the CFRP sandwich panel 1 shown in FIG. 2A is, for example, 510×1600 mm. FIG. 2A also shows the holes provided for the connecting contacts of the antennae.

Figure 3:
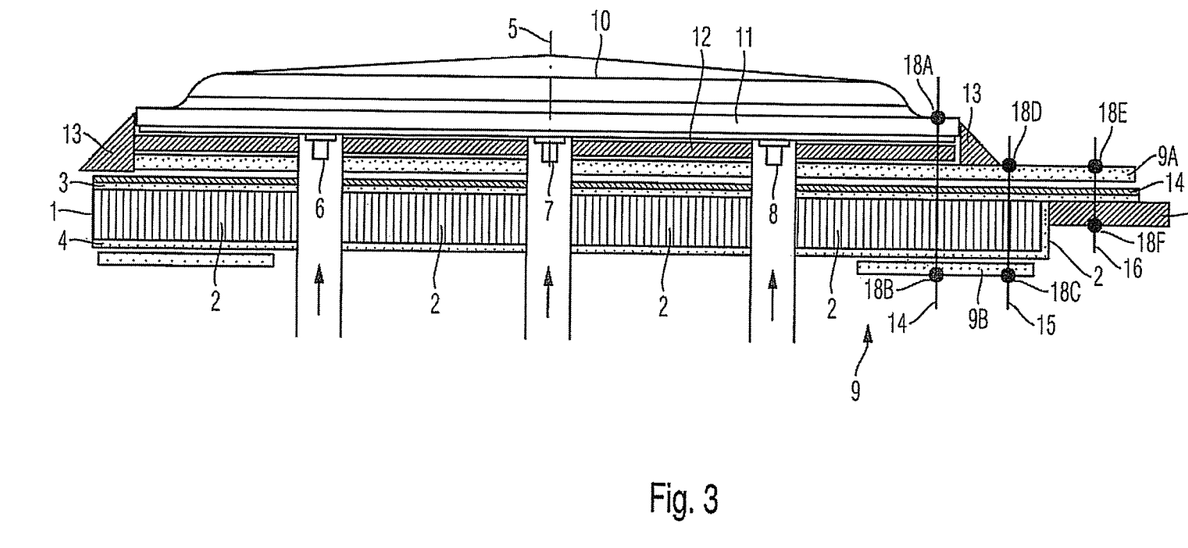
FIG. 3 shows a detail of the sectional view shown in FIG. 2B, to illustrate an embodiment of the lightning protection arrangement according to the invention.

FIG. 3 shows a detail view of the cross-sectional view shown in FIG. 2B. FIG. 3 shows a possible embodiment of a lightning protection arrangement 9 according to the invention for protecting an electronic unit 5 against the direct effects of a lightning strike. The electronic unit 5 in the embodiment shown in FIG. 3 is an antenna, for example a CRPA (control radiation pattern antenna). This antenna has a sheath 10 consisting of an electrically non-conductive material which is also called a radome. This sheath 10 serves to protect the actual antenna which is fitted underneath. Furthermore, the antenna has a foot 11 which consists, for example, of metal. Provided on the lower side of the antenna are connecting contacts 6, 7, 8, which are, for example, coaxial connectors. These can be contacted from the inside of an aircraft fuselage via electrical connector plugs. Corresponding holes are made for this purpose in the CFRP sandwich panel 1. These holes pass through the three layers 2, 3, 4 of the CFRP sandwich panel 1. The electronic unit 5 or the mentioned antenna rests on a mounting plate 9A of the lightning protection arrangement according to the invention, separated by an anticorrosive sealing layer 12. The anticorrosive sealing layer 12 consists, for example, of a rubber. This anticorrosive sealing layer 12 forms a moisture barrier and protects in particular the underlying mounting plate 9A against corrosion. In addition, a seal 13 can be provided which, on the one hand, surrounds the antenna foot 11 and the underlying sealing layer 12 and, on the other hand, laterally also protects the mounting plate 9A against moisture, in addition to the antenna foot 11 and the sealing layer 12, and reduces the aerodynamic drag of the aircraft. As shown in FIG. 3, located under the mounting plate 9A is a copper mesh 20 which rests on the outer or upper CFRP sheet 3 and protects it against lightning strikes which would possibly result in holes in the CFRP sandwich panel 1.

The device 9 according to the invention has, in addition to the electrically conductive mounting plate 9A, a further electrically conductive rear plate 9B. In the embodiment shown in FIG. 3, this electrically conductive rear plate 9B is annular. The annular shape can minimise the inherent weight of the electrically conductive rear plate 9B. As shown in FIG. 3, the two electrically conductive plates 9A, 9B of the device 9 according to the invention are connected together via a group of electrically conductive attachment means 14. These electrically conductive attachment means 14 are preferably screws with an electrically conductive surface protection. A group of attachment means or screws consists, for example, of four symmetrically arranged screws. In the embodiment shown in FIG. 3, the group of screws 14 electrically connects the antenna foot 11 to the conductive rear plate 9B of the device 9 according to the invention. The two electrically conductive plates, i.e. the mounting plate 9A and the rear plate 9B, are preferably made of titanium. On the one hand, titanium is characterised by a low inherent weight and good electrical conductivity. On the other hand, the electrochemical potential difference between titanium and both the copper alloy, consisting of the wire mesh 20, and the CFRP, consisting of the inner CFRP layer, is low, so that corrosion can be minimised.

In an alternative embodiment, the mounting plate 9A and the rear plate 9B are produced from aluminium. In alternative embodiments, the two plates 9A, 9B are produced from other metals which have a low inherent weight.

In a further possible embodiment, the two plates 9A, 9B do not consist of a pure metal or of a metal alloy, but of another material with good electrical conductivity, which provides adequate stability and also has a low inherent weight. A metallised plastics material could optionally be selected as an example.

As can be seen in FIG. 3, the device 9 according to the invention in the illustrated embodiment has, in addition to the first group of attachment means 14, a second group of attachment means 15 which can also be screws. This second group of attachment means 15 connects the rear plate 9B electrically to the mounting plate 9A. The second group of attachment means 15 is arranged in the outer periphery of the annular rear plate 9B.

In the embodiment shown in FIG. 3, the mounting plate 9A is electrically connected to a retaining structure 17 by a further or third group of attachment means 16 and is connected by this retaining structure 17 to the fuselage of the aircraft. The retaining structure 17 also consists of metal or of another material with good electrical conductivity.

The device 9 shown in FIG. 3 affords a reliable protection of the electronic component 5, i.e. the antenna, against the effects of a lightning strike. In a lightning strike, the overvoltage generated thereby is diverted by an electrical current (lightning strike) which flows from the electrically conductive antenna foot 11 via the first group of attachment means 14 to the second electrically conductive plate 9B (rear plate). From the rear plate 9B, the current directed there flows back via the second group of attachment means 15 to the mounting plate 9A and from there via the third group of attachment means 16 to the metallic substructure or the retaining structure 17 of the aircraft fuselage. In a possible embodiment, there is also an electrical connection between the first electrically conductive attachment means 14 and the mounting plate 9A. Lightning which strikes inside the electrical component 5 is thus diverted into the metallic or conductive fuselage structure of the aircraft by the lightning protection arrangement according to the invention, the lightning current flowing via the electrically conductive plate 9A, 9B into the retaining structure 17 and from there, being diverted into the remaining fuselage region of the aircraft. This diverted lightning re-emerges in another location of the aircraft fuselage.

As can be seen from FIG. 3, the device according to the invention has a plurality of ground points 18A to 18F to ensure lightning protection. An electrical connection with very low electrical transition resistances is at the ground points 18A to 18F.

In the embodiment shown in FIG. 3, the three groups of attachment means 14, 15, 16 preferably each consist of four screw/plate nuts with electrically conductive surface protection. The screws have a minimum diameter. Screws have the advantage that they can be easily released.

The embodiment shown in FIG. 3 has the particular advantage that the CFRP sandwich panel 1, including the electronic component 5 attached thereto, i.e. for example an antenna, can be easily and rapidly dismounted from the retaining structure 17 of the aircraft fuselage. The entire panel 1 can therefore be replaced within a relatively short period of time, for example within a few minutes. This is particularly significant if an electronic component 5, for example an antenna or a sensor, fails for any reason and has to be quickly replaced during a stopover of an aircraft. In the embodiment according to FIG. 3, the illustrated attachment means 14, 15, 16 are used for the electrical connection to provide a low electrical transition resistance at the transition points (positioning component) of the layers (elements) which rest on one another and are to be attached for each presented CFRP sandwich panel 1 for diverting a generated lightning current which, diverted from the electronic component 5, is to flow away in or through the fuselage structure of the aircraft. In the embodiment shown in FIG. 3, the transition resistance for diverting a current generated during a lightning strike is less than 5 mΩ.

In addition to the attachment means 14, 15, 16 shown in FIG. 3 which are usually screws, further attachment means can be provided which are used for the mechanical attachment when certain peripheral conditions, for example conductive surface protection and adequate diameter, are satisfied.

In an alternative embodiment, the attachment means 14, 15, 16 can also be formed by electrically conductive rivets or bolts.

Figure 4A:
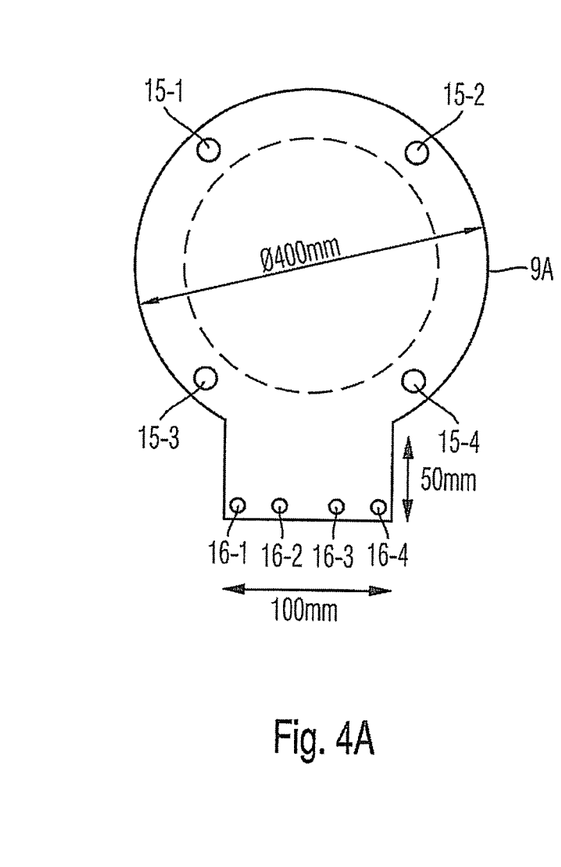
FIG. 4A, 4B show possible embodiments of the mounting plate and of the rear plate used in the device according to the invention.

FIG. 4A shows an embodiment of a mounting plate 9A used in the device 9 according to the invention. In this embodiment, the mounting plate 9A consists of a circular titanium disc with a diameter of 400 mm and a thickness of 2.5 mm (due to the use of countersunk screws, to reduce aerodynamic drag). Provided in the periphery of the mounting plate 9A are holes for electrically conductive screws which are used to divert overvoltages. Furthermore, four holes, for example, can be provided to implement lightning protection of the antenna with four electrically conductive screws 16-1, 16-2, 16-3, 16-4. These holes have a diameter of, for example, 5.2 mm. The electrically conductive screws can have a diameter of, for example, 4.8 mm. In a possible embodiment, the screws 15-$i$ are guided through the holes, being at a distance of 10 mm from the edge of the mounting plate 9A.

Figure 4B:
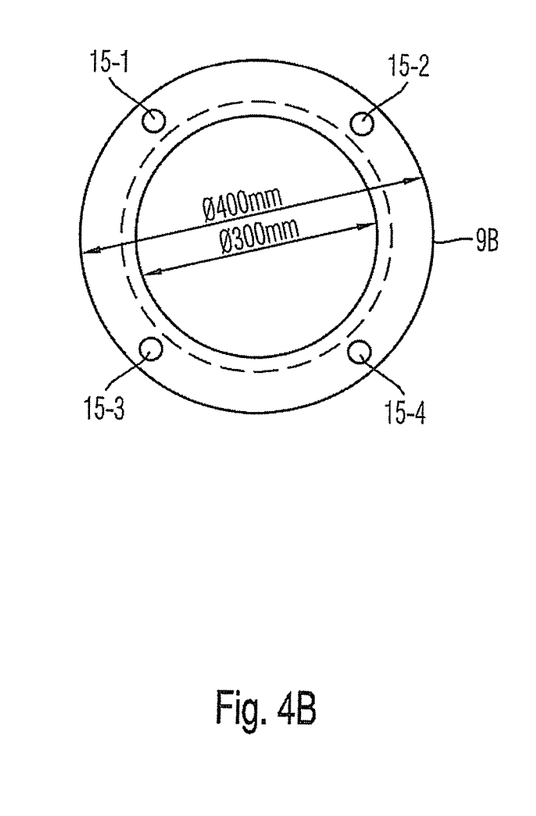

FIG. 4B shows a possible embodiment of the rear plate 9B. This plate can also be made of titanium, with a thickness of, for example, 1.2 mm. As shown in FIG. 4B, the rear plate 9B is preferably not a disc, but is annular to reduce unnecessary weight. In the illustrated embodiment, the external diameter of the annular rear plate 9B is also 400 mm, like the mounting plate 9A. The internal diameter is, for example, 300 mm. In an alternative embodiment, the rear plate 9B is also disc-shaped like the mounting plate 9A and has holes for connecting the contacts 6, 7, 8 of the electronic component 5. The device 9 according to the invention is suitable not only for aircraft, but also for other flying objects, for example helicopters.

The titanium mounting plate 9A shown in FIG. 4A has a projection 19 which is provided with a plurality of holes. The third attachment means or screws 16-1, 16-2, 16-3, 16-4 shown in FIG. 3 can be guided through these holes.

LIST OF REFERENCE NUMERALS

1 CFRP sandwich panel
2 middle layer
3 CFRP sheet
4 CFRP sheet
5 electrical unit
6 connecting contact
7 connecting contact
8 connecting contact
9A mounting plate
9B rear plate
10 sheath
11 antenna foot
12 sealing layer
13 seal
14 attachment means
15 attachment means
16 attachment means
17 retaining structure
18A ground points
18B ground points
18C ground points
18D ground points
18E ground points
18F ground points
19 projection
20 wire mesh

The invention claimed is:

1. A lightning protection arrangement for an aircraft for protecting an electronic unit from lightning, which arrangement is capable, during a lightning strike, of diverting a lightning current onto an electrically conductive retaining structure of the fuselage of the aircraft, wherein the electronic unit is attached to an aerodynamic fairing outside the aircraft, the lightning protection arrangement comprising:

a) an electrically conductive mounting plate which is arranged on an outer side of a CFRP sandwich panel of the aerodynamic fairing;

b) an electrically conductive rear plate which is arranged on an inner side of the CFRP sandwich panel of the aerodynamic fairing and is connected in an electrically conductive manner to the mounting plate;

c) a first electrically conductive and detachable attachment means which connects the electronic unit and the rear plate and further the mounting plate and the rear plate, a second electrically conductive and detachable attachment means which connects the rear plate electrically to the mounting plate and a third electrically conductive and detachable attachment means to connect the mounting plate to the electrically conductive retaining structure;

wherein said first electrically conductive and detachable attachment means is provided to attach the electronic unit to a body, and by which an electrically conducting connection is realised between the electronic unit and the mounting and rear plates arranged on the CFRP sandwich panel, such that during a lightning strike, a low-resistance current path is provided for the lightning current from the electronic unit via the mounting plate and the rear plate, from which current path the lightning current is diverted onto the electrically conductive retaining structure of the lightning protection arrangement which is connected to the mounting plate via the third electrically conductive and detachable attachment means, wherein the electronic unit is arranged in the center of the mounting plate, an anticorrosive sealing layer being placed on the mounting plate and on which the mounting plate is positioned.

2. The lightning protection arrangement according to claim 1, wherein the CFRP sandwich panel has at least one upper CFRP sheet which consists of carbon fibre-reinforced plastics material, a honeycomb-structured layer and at least one lower CFRP sheet which consists of carbon fibre-reinforced plastics material.

3. The lightning protection arrangement according to claim 2, wherein a metallic wire mesh or a metal foil is provided on the upper CFRP sheet of the CFRP panel to protect the CFRP panel against the effects of a lightning strike.

4. The lightning protection arrangement according to claim 3, wherein the wire mesh consists of a metal alloy.

5. The lightning protection arrangement according to claim 4, wherein the wire mesh consists of a copper alloy.

6. The lightning protection arrangement according to claim 4, wherein the wire mesh is a bronze wire mesh.

7. The lightning protection arrangement according to claim 3, wherein the mounting plate consists of a metal which has a low potential difference compared to the material of the wire mesh in the electrochemical series and has a low weight.

8. The lightning protection arrangement according to claim 1, wherein the mounting plate and the rear plate consist of titanium.

9. Lightning protection arrangement according to claim 1, wherein to reduce weight, the rear plate is configured annularly.

10. The lightning protection arrangement according to claim 1, wherein the outer periphery of the rear plate is connected in an electrically conducting manner to the mounting plate via electrical and conductive attachment means.

11. The lightning protection arrangement according to claim 10, wherein the periphery of the mounting plate is connected in an electrically conducting manner to the electrically conductive retaining structure via electrically conductive attachment means, the lightning current flowing via the electrically conductive plates into the retaining structure and being able to be diverted from there into the remaining fuselage region of the aircraft.

12. The lightning protection arrangement according to claim 11, wherein a guide path for an overvoltage which is generated during a lightning strike and is diverted onto the electrically conductive retaining structure runs from the electronic unit via a first group of attachment means to the rear plate and from there via a second group of attachment means to the mounting plate and from there via a third group of attachment means to the retaining structure.

13. The lightning protection arrangement according to claim 12, wherein the groups of attachment means are realised by metallic screws.

14. The lightning protection arrangement according to claim 13, wherein the groups of attachment means are realised at least by four screws having an electrically conductive surface protection.

15. The lightning protection arrangement according to claim 12, wherein the groups of attachment means are reinforced by bolts.

16. The lightning protection arrangement according to claim 11, wherein the electrically conductive retaining structure is a substructure of a safety region of an aircraft structure which is metallic.

17. The lightning protection arrangement according to claim 1, wherein the electronic unit is embodied by an antenna, a sensor element, a signal light or by an illumination unit.

18. The lightning protection arrangement according to claim 1, wherein the transition resistance for diverting the current onto the aircraft fuselage is less than 5 m$\Omega$.

19. The lightning protection arrangement according to claim 1, wherein the electrically conductive retaining structure is metallic.

20. The lightning protection arrangement according to claim 1, wherein the aerodynamic fairing is an integrated component of an aircraft structure.

21. The lightning protection arrangement according to claim 20, wherein the aerodynamic fairing is an integrated component of the aircraft fuselage.

22. An aerodynamic fairing for an aircraft with a lightning protection arrangement according to claim 1.

23. An aircraft with an aerodynamic fairing according to claim 22.

24. The lightning protection arrangement according to claim 1, wherein the anticorrosive sealing layer consists of a non-conductive material.

25. The lightning protection arrangement according to claim 24, wherein the non-conductive material is rubber.

* * * * *